United States Patent
Hör et al.

(10) Patent No.: US 11,668,282 B2
(45) Date of Patent: Jun. 6, 2023

(54) WIND ENERGY INSTALLATION AND A METHOD OF OPERATING A WIND ENERGY INSTALLATION

(71) Applicant: Siemens Gamesa Renewable Energy Service GmbH, Hamburg (DE)

(72) Inventors: Oliver Hör, Bredenbek (DE); Stefan Behl, Neumünster (DE); Karsten Warfen, Weede/Söhren (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 34 days.

(21) Appl. No.: 17/366,652

(22) Filed: Jul. 2, 2021

(65) Prior Publication Data
US 2022/0003209 A1    Jan. 6, 2022

(30) Foreign Application Priority Data

Jul. 3, 2020   (DE) ............... 10 2020 004 034.9
Jul. 3, 2020   (DE) ............... 10 2020 004 035.7
Jul. 3, 2020   (DE) ............... 10 2020 004 036.5

(51) Int. Cl.
*F03D 7/02*    (2006.01)

(52) U.S. Cl.
CPC ......... *F03D 7/0264* (2013.01); *F03D 7/0224* (2013.01); *F05B 2260/70* (2013.01); *F05B 2260/76* (2013.01)

(58) Field of Classification Search
None
See application file for complete search history.

(56) References Cited

U.S. PATENT DOCUMENTS

| 7,602,074 B2 | 10/2009 | Voss |
| 7,764,029 B2 | 7/2010 | Buente et al. |
| 8,021,112 B2 * | 9/2011 | Dinjus .............. F03D 7/0244 416/61 |

(Continued)

FOREIGN PATENT DOCUMENTS

| DE | 10253811 A1 | 6/2004 |
| DE | 10335575 A1 | 3/2005 |

(Continued)

OTHER PUBLICATIONS

German Patent Office; Search Report in related German Patent Application No. 10 2020 004 034.9 dated May 5, 2021; 6 pages.

(Continued)

*Primary Examiner* — Juan G Flores
(74) *Attorney, Agent, or Firm* — Dorton & Willis, LLP

(57) ABSTRACT

A method of operating a wind energy installation having a rotor with at least one rotor blade that is angularly adjustable by an adjustment drive. In response to the occurrence of at least one special operating case, in particular at least one malfunction case, the rotor blade is adjusted in a direction of a shutdown position by the adjustment drive. In the shutdown position, a supply of energy from an energy storage device to the adjustment drive is switched off and/or a pitch brake for holding the rotor blade in its current position is closed. In response to at least one activation signal, the rotor blade is adjusted by the adjustment drive in an adjustment mode of operation while the special operating case is still ongoing, in particular while the malfunction case is still ongoing.

20 Claims, 2 Drawing Sheets

(56) References Cited

U.S. PATENT DOCUMENTS

| | | | |
|---|---|---|---|
| 8,157,523 B2* | 4/2012 | Warfen | F03D 7/0224 |
| | | | 416/61 |
| 9,677,541 B2 | 6/2017 | Fahrner | |
| 9,777,710 B2 | 10/2017 | Muik | |
| 9,879,652 B2 | 1/2018 | Eden | |
| 9,945,358 B2* | 4/2018 | Vilbrandt | F03D 7/0264 |
| 2009/0115191 A1* | 5/2009 | Warfen | F03D 7/0264 |
| | | | 290/44 |
| 2011/0142594 A1* | 6/2011 | Dinjus | F03D 7/0224 |
| | | | 416/26 |
| 2012/0146333 A1 | 6/2012 | Bywaters et al. | |
| 2013/0134708 A1 | 5/2013 | Hamano | |
| 2013/0243624 A1 | 9/2013 | Schaefer et al. | |
| 2014/0127014 A1* | 5/2014 | Vilbrandt | F03D 7/0264 |
| | | | 416/46 |
| 2019/0010924 A1 | 1/2019 | Theopold et al. | |

FOREIGN PATENT DOCUMENTS

| | | |
|---|---|---|
| DE | 102004024563 A1 | 12/2005 |
| DE | 102006049490 A1 | 4/2008 |
| DE | 102007049368 A1 | 5/2008 |
| DE | 102007052863 A1 | 5/2009 |
| DE | 202010004045 U1 | 8/2011 |
| DE | 102010019444 A1 | 11/2011 |
| DE | 102010037695 A1 | 3/2012 |
| DE | 102011079269 A1 | 1/2013 |
| DE | 102012101484 A1 | 8/2013 |
| DE | 102013004580 A1 | 9/2014 |
| DE | 102015010227 A1 | 2/2017 |
| DE | 102016111859 A1 | 1/2018 |
| WO | 2012069532 A1 | 5/2012 |

OTHER PUBLICATIONS

German Patent Office; Search Report in related German Patent Application No. 10 2020 004 035.7 dated May 4, 2021; 7 pages.
German Patent Office; Search Report in related German Patent Application No. 10 2020 004 036.5 dated May 7, 2021; 6 pages.
European Patent Office; Examination Report in related European Patent Application No. 21 18 3320 dated Dec. 8, 2021; 7 pages.

\* cited by examiner

WIND ENERGY INSTALLATION AND A METHOD OF OPERATING A WIND ENERGY INSTALLATION

CROSS-REFERENCE TO RELATED APPLICATIONS

This application claims the benefit of priority under 35 U.S.C. § 119(a) to German Patent Application Nos. DE 10 2020 004 034.9, filed Jul. 3, 2020 (pending), DE 10 2020 004 035.7, filed Jul. 3, 2020 (pending), and DE 10 2020 004 036.5, filed Jul. 3, 2020 (pending), the disclosures of which are hereby incorporated by reference in their entirety.

TECHNICAL FIELD

The present invention relates to a wind energy installation, a method of operating a wind energy installation, as well as a computer program product for carrying out the method.

BACKGROUND

Wind energy installations with rotor blades which can be adjusted in terms of their angle are known from internal practice within the present applicant company.

By adjusting the rotor blades to a feathered position, in which they, at least substantially, do not generate any power at a rotor axis of rotation or at a rotor hub, in particular a power of the wind energy installation can be controlled and/or a load can be reduced in case of (too) strong wind.

From internal practice within the present applicant company, it is known, in the event of a malfunction case, to rotate the rotor blades to the feathered position and to hold them there by means of pitch brakes. In the event of a power failure, the blades remain in this feathered position until normal adjustment operation is reactivated as a result of the supply of electrical energy being restored.

SUMMARY

It is an object of the present invention to improve the operation of a wind energy installation.

This object is solved by a method, a wind energy installation, and a computer program product for carrying out a method as described herein.

According to one embodiment of the present invention, a wind energy installation comprises a rotor with at least one rotor blade which can be adjusted in terms of its angle, and an adjustment drive, with the aid of which this rotor blade can be adjusted (in terms of its angle) or is adjusted (in terms of its angle) or is provided for this purpose, or is in particular set up for this purpose or is used for this purpose, in particular by means of which this rotor blade can be adjusted (in terms of its angle) or is adjusted (in terms of its angle) or is provided for this purpose, or is in particular set up for this purpose or is used for this purpose.

According to one embodiment, the rotor is mounted on a nacelle of the wind energy installation so as to be able to rotate about a rotor axis of rotation, in particular a horizontal rotor axis of rotation, and according to one embodiment it is coupled to a generator for converting a rotation of the rotor or a power of the rotor into electrical energy, in particular for feeding into a (power supply or electricity) grid. According to one embodiment, the nacelle is arranged on a tower and, according to one embodiment, is able to be rotated, by means of a nacelle drive, about a vertical nacelle axis of rotation. According to one embodiment, the rotor comprises a plurality of rotor blades which can be adjusted in terms of their angle, according to one embodiment three rotor blades which can be adjusted in terms of their angle, and which, according to one embodiment, are distributed (or are arranged in a distributed manner) along a circumference of the rotor.

Without being limited thereto, the present invention is particularly suitable for such wind energy installations, in particular because of the loads and operating conditions encountered in connection with these.

According to one embodiment, one or more rotor blades of the rotor, in particular all rotor blades of the rotor can (each) be adjusted (in terms of their angle) by means of their own adjustment drive.

According to one embodiment, by means of this, the blade pitch can be adjusted individually, and thereby the safety can be increased and/or the power control of the wind energy installation can be improved.

In the present application, an adjustment of a rotor blade (in terms of its angle) is intended to be understood to refer in particular to a rotation of the rotor blade about a rotor blade axis of rotation which extends in the longitudinal direction of the rotor blade and/or transverse to the rotor axis of rotation. In so far as an adjustment or a position is mentioned in the present application, this can be (respectively) a rotation or an angular position or an angular orientation about the rotor blade axis of rotation.

According to one embodiment of the present invention, in the event that at least one special operating case should occur, or in the event that the occurrence of at least one special operating case is detected, in particular as a result of at least one special operating case occurring, or as a result of the occurrence of at least one special operating case being detected, according to one embodiment in the event that at least one malfunction case should occur, or in the event that the occurrence of at least one malfunction case is detected, in particular as a result of at least one malfunction case occurring, or as a result of the occurrence of at least one malfunction case being detected, the rotor blade or one or more, preferably all, rotor blades are (each) adjusted with the aid of the adjustment drive, according to one embodiment with the aid of their individual adjustment drive, in a direction of a shutdown position, according to one embodiment in a direction of a predefined shutdown position, in particular in a direction of a shutdown position which is predefined in advance and/or which is fixedly predefined, and according to one embodiment it is adjusted to (or all the way into) the shutdown position.

According to one embodiment, this shutdown position is a feathered position, in which the (respective) rotor blade, at least substantially, does not generate any power at the rotor axis of rotation or at the rotor hub.

According to one embodiment, by means of this, a dynamic load on the wind energy installation can be reduced in a particularly advantageous manner.

According to another embodiment, this shutdown position is a spinning position in which a power generated by the (respective) rotor blade at the rotor axis of rotation or at the rotor hub is at most 10 percent, in particular at most 5 percent, in particular at most 1 percent, of a maximum power that can be generated by the rotor blade at the rotor axis of rotation or at the rotor hub under the same wind conditions and/or which deviates from the feathered position by at most 20 degrees, according to one embodiment by at most 15 degrees.

According to one embodiment, by means of this, a small rotation of the rotor about the rotor axis of rotation can be effected and, in an advantageous manner, by means of this, in particular an inhomogeneous static load on the wind energy installation can be reduced and/or a lubrication can be improved.

According to one embodiment of the present invention, the wind energy installation has an energy storage device in order to adjust the at least one rotor blade in the direction of the shutdown position with the aid of its adjustment drive in case the special operating case occurs, in particular in the event that at least one malfunction case occurs, in particular to supply the adjustment drive with (drive) energy for this purpose. According to one embodiment, the energy storage device is an internal or an off-grid energy storage device, and in one embodiment, it is arranged in the wind energy installation, in particular in the rotor or in the nacelle. In the present application, the term "grid" is intended to be understood to mean in particular an electricity grid or a network for the transmission and distribution of electrical energy between a plurality of buildings. According to one embodiment, in the event that at least one special operating case should occur, or in the event that the occurrence of at least one special operating case is detected, in particular as a result of at least one special operating case occurring, or as a result of the occurrence of at least one special operating case being detected, according to one embodiment in the event that at least one malfunction case should occur, or in the event that the occurrence of at least one malfunction case is detected, in particular as a result of at least one malfunction case occurring, or as a result of the occurrence of at least one malfunction case being detected, the rotor blade or one or more, preferably all, rotor blades are (each) adjusted with the aid of the adjustment drive, according to one embodiment with the aid of their individual adjustment drive, in a direction of a shutdown position, according to one embodiment in a direction of a specified shutdown position, in particular in a direction of a shutdown position which is specified in advance and/or which is fixedly predefined, according to one embodiment it is adjusted to (or all the way into) the shutdown position, wherein, during the course of this, or for this purpose, the adjustment drive or one or more of the adjustment drives are supplied with energy by the energy storage device or energy storage devices.

According to one embodiment, by means of this, the shutdown position can be approached reliably, or more reliably, in particular also in the event of a power failure.

According to one embodiment of the present invention, a supply of energy of the adjustment drive from the energy storage device, with the aid of which the rotor blade has been adjusted in the direction of the shutdown position on the occasion of the special operating case having occurred, in particular on the occasion of the malfunction case having occurred, is switched off in the shutdown position. According to one embodiment, a switching off of this supply of energy takes place, and in one embodiment, a switching off of this supply of energy takes place when the shutdown position has been reached.

According to one embodiment, by means of this, the safety can be improved, and in particular an unintentional actuation of the adjustment drive beyond the shutdown position can be avoided.

According to one embodiment, two or more of the adjustment drives have a common energy storage device for adjusting the rotor blades in the direction of their shutdown positions on the occasion of the special operating case occurring, in which case, according to one embodiment, in the shutdown position of the respective rotor blade, the supply of energy of its adjustment drive from this common energy storage device is switched off, and in particular a switching off of the supply of energy of its adjustment drive from this common energy storage device takes place, and according to one embodiment, the supply of energy of its adjustment drive from this common energy storage device is switched off when the respective shutdown position has been reached.

According to one embodiment, by means of this, the wind energy installation can be built in a more compact manner.

According to one embodiment, two or more of the adjustment drives each have their own energy storage device for adjusting the respective rotor blade in the direction of its shutdown positions when the special operating case occurs, in which case, according to one embodiment, in the shutdown position of the respective rotor blade, the supply of energy of its adjustment drive from its own energy storage device is switched off, and in particular a switching off of the supply of energy of its adjustment drive from its own energy storage device takes place, and according to one embodiment, the supply of energy of its adjustment drive from its own energy storage device is switched off when the shutdown position has been reached.

According to one embodiment, by means of this, the safety can be improved.

In addition or as an alternative to this disconnection of the supply of energy from the energy storage device, according to one embodiment of the present invention, a pitch brake of the wind energy installation is closed in the shutdown position, which pitch brake seeks to hold the rotor blade in its current position, in particular holds it in its current position, or is provided for this purpose, or is in particular set up for this purpose or is used for this purpose.

According to one embodiment, by means of this, the safety can be improved.

According to one embodiment, the pitch brake is closed when the shutdown position is reached or after the shutdown position has been reached.

According to one embodiment, by means of this, wear and/or an energy consumption can be reduced.

According to one embodiment, two or more of the rotor blades each have their own pitch brake for holding the respective rotor blade in its current position, wherein, according to one embodiment, in the shutdown position of the respective rotor blade, its pitch brake is then closed, and according to one embodiment a closing of the pitch brake takes place when the shutdown position is reached or has been reached.

According to one embodiment, by means of this, the safety can be improved.

According to one embodiment of the present invention, in an adjustment mode of operation, the rotor blade is adjusted (in terms of its angle) with the aid of the adjustment drive on the basis of at least one activation signal, while the special operating case is still ongoing.

One embodiment of the present invention is based on the idea of reacting in an advantageous manner after the shutdown position has been approached, despite the special operating case still ongoing, in particular reacting to conditions or events that occur during the (still ongoing) special operating case.

For example it may in particular be desirable to continue to adjust the rotor blade or the rotor blades from the shutdown position which has been approached, while the special operating case is still ongoing:

If, for example, the shutdown position is not a feathered position, but (only) a spinning position, for example, this can interfere with maintenance by maintenance personnel. In this case, it may be advantageous to be able to (further) adjust the rotor blade or the rotor blades to a feathered position with the aid of the drive or drives while the special operating case is still ongoing.

Similarly, it may be desirable, for example, to adjust from a spinning position to a feathered position also during the special operating case, for example, in particular so as to reduce a rotational speed of the rotor and/or a load on the rotor as the wind increases.

In case the pitch brake slips (through) during the special operating case, according to one embodiment this can advantageously be reacted to by resetting with the aid of the (respective) adjustment drive.

According to one embodiment, on the basis of at least one reactivating activation signal, in particular as a result of at least one reactivating activation signal, the supply of energy of the adjustment drive or of one or more of the adjustment drives from the (respective) energy storage device (in particular from the common or individual energy storage device) for adjusting the rotor blade is switched on again and the (respective) rotor blade is adjusted with the aid of this supply of energy (which has been switched on again) of the (respective) adjustment drive in a reactivation adjustment mode of operation while the special operating case is still ongoing.

This represents a deliberate departure from a previous safety concept, according to which the supply of energy from the energy storage device or from the energy storage devices is switched off and remains switched off after the shutdown position has been approached, in order to prevent an unintentional adjustment by means of the adjustment drives during the special operating case, and so that a restart is provided only after the end of the special operating case, as part of which the adjustment drives are no longer supplied with energy from the energy storage device or energy storage devices, but are (again regularly) supplied with energy from an external source of energy such as an (electricity) grid, a hydraulic source or the like.

According to one embodiment, a reactivating activation signal can be triggered by a manual input via at least one interface, and in particular a triggering of a reactivating activation signal becomes possible by a manual input via at least one interface, and in particular a triggering of a reactivating activation signal takes place by a manual input via at least one interface.

According to one embodiment, by means of this, it is possible for maintenance personnel to move the rotor blade or the rotor blades from the shutdown position to a feathered position with the aid of the respective adjustment drive and energy storage device during the special operating case which is still ongoing. This can be advantageous in particular if, according to one embodiment, the rotor is spinning in the shutdown position after a malfunction case, in particular in the event of a sustained power failure. If this rotor is to be entered by maintenance personnel for the purpose of inspection, the insertion of a rotor lock and, if necessary, securing with bolts, is required beforehand, while the rotor is positioned at a standstill. According to one embodiment, this stopping and/or positioning of the rotor can be carried out by means of the adjustment, described above, from the shutdown position to the feathered position, without there being a need to wait for power to be restored. In general, according to one embodiment, after the adjustment of the rotor blade or of the rotor blades with the aid of the respective adjustment drive and energy storage device into a feathered position or the feathered position in a reactivation adjustment mode of operation or in the reactivation adjustment mode of operation, the rotor is locked, according to one embodiment while the special operating case is still ongoing, in particular while the malfunction case is still ongoing, and according to one embodiment, a rotor lock is inserted and, in a further development, is secured with bolts before maintenance personnel is then allowed to enter the stationary rotor for inspection, and according to one embodiment before maintenance personnel then enters the stationary rotor for inspection.

According to one embodiment, the at least one interface is arranged on the rotor, in particular in such a way that it is visible from the nacelle and/or in such a way that it can be reached from the nacelle, in particular manually.

According to one embodiment, by means of this, the safety can be improved, and in particular the reactivating activation signal can be triggered directly on site, preferably with visual contact.

According to one embodiment, the manual triggering is possible via two or more interfaces, which, according to one embodiment, are arranged on the rotor, in particular which are distributed along a circumference of the rotor, and which, according to one embodiment, are arranged on sides of the rotor which are opposite to one another.

According to one embodiment, by means of this, the safety can be improved, and in particular the reactivating activation signal can be triggered at different rotational positions of the rotor.

According to one embodiment, the manual triggering of the reactivating activation signal requires at least two manual inputs, according to one embodiment at least two sequential manual inputs, according to one embodiment two sequential manual inputs which are temporally spaced. According to one embodiment, first, a switch to a standby mode is made by means of a manual input at the interface or at at least one of the interfaces, according to one embodiment for a predetermined period of time, and, according to one embodiment, this is indicated, according to one embodiment at the interface or the interfaces, in particular by the interface or interfaces, and only when a further manual input is made during the standby mode is the supply of energy from the energy storage device or from the energy storage devices for adjusting the rotor blade or the rotor blades then switched on again and, according to one embodiment, this adjustment is also initiated. According to one embodiment, an interface comprises a button which is constructed in terms of hardware or software.

According to one embodiment, by means of this, the safety can be improved, and in particular the likelihood of an unintentional adjustment can be reduced.

In addition or as an alternative to a manual input, according to one embodiment a reactivating activation signal is triggered if it is detected that a rotational speed of the rotor or a load on the rotor, in particular a load on the rotor blade, exceeds a predetermined threshold value, in particular a predetermined maximum rotational speed or a predetermined maximum load.

According to one embodiment, by means of this, the safety can be improved, and in one embodiment, a feathered position can automatically be approached in stronger winds.

According to one embodiment, the pitch brake (of the respective rotor blade or of the respective rotor blades) is open or is opened, at least temporarily, during the reactivation adjustment mode of operation or during the adjustment of the (respective) rotor blade, which is carried out with the aid of the supply of energy from the energy storage device or from the energy storage devices, and, according to one embodiment, the pitch brake is closed after the adjustment in the reactivation adjustment mode of operation, or such a closing of the pitch brake takes place after the adjustment in the reactivation adjustment mode of operation.

According to one embodiment, by means of this, wear and/or an energy consumption can be reduced.

Similarly, the pitch brake (of the respective rotor blade or of the respective rotor blades) can also be closed, in particular it can remain closed, during the reactivation adjustment mode of operation or during the adjustment of the (respective) rotor blade, which is carried out with the aid of the supply of energy from the energy storage device or from the energy storage devices.

According to one embodiment, by means of this, the safety can be improved.

According to one embodiment, the rotor blade or one or more of the rotor blades are (each) adjusted to a predetermined target position or by a predetermined amount, in particular in a predetermined direction, in the reactivation adjustment mode of operation.

According to one embodiment, by means of this, as has already been explained, a transition from the shutdown position to the feathered position can be made, if required.

According to one embodiment, an activation signal which is deviation-dependent is triggered if, in particular with the pitch brake (still) being closed, or despite the pitch brake (still) being closed, a deviation (of the angular position) of the (respective) rotor blade from a target position or from its target position exceeds a predetermined threshold value and/or if this is detected, and on the basis of the activation signal which is deviation-dependent, and in particular as a result of the activation signal which is deviation-dependent, the rotor blade is adjusted in a brake assisting adjustment mode of operation while the special operating case is still ongoing, wherein, in the brake assisting adjustment mode of operation, the rotor blade is adjusted in the direction of the target position, and according to one embodiment the target position is approached, or the adjustment drive tries to achieve this.

According to one embodiment, this target position is the shutdown position. In addition or as an alternative, the deviation (of the angular position) of the (respective) rotor blade from a target position or from its target position is detected by one or preferably at least two sensors.

According to one embodiment, by means of this, if a rotor blade slips away from an approached feathered position, the rotor blade can be returned to the feathered position with the aid of the adjustment drive and the energy storage device, even though the special operating case is still ongoing. According to one embodiment, by means of this, the safety can be improved. In this context, the angular position and/or the deviation can reliably be detected, or can be detected more reliably, by the use of at least two sensors, in particular by the use of at least two redundant sensors, and thereby the safety can be improved further.

In another embodiment, the target position is a target position which is different from the shutdown position, or a target position which is predetermined differently from the shutdown position, the target position can in particular be the feathered position, and, in a corresponding manner, the shutdown position can be a position which is different therefrom, in particular a spinning position.

According to one embodiment, by means of this, the shutdown position can be approached first and at least the holding of (or in) the feathered position can be ensured by the brake assisting adjustment mode of operation. According to one embodiment, by means of this, the safety can be improved and an inhomogeneous static load on the wind energy installation can be reduced and/or a lubrication can be improved.

According to one embodiment, the rotor blade moves to the target position on the shorter of at least two possible adjustment paths in the brake assisting adjustment mode of operation, and/or its adjustment drive is controlled accordingly. If, for example, 90 degrees designates the target position and an angular position of the rotor blade of 95 degrees, i. e. a deviation of +5 degrees, is detected, the rotor blade is adjusted in the negative direction. If, on the other hand, an angular position of the rotor blade of 85 degrees, i. e. a deviation of −5 degrees, is detected, the rotor blade is adjusted in the positive direction. In each case, this represents the shorter path compared to an adjustment from 95 degrees in the positive direction (95 degrees→360 degrees=0 degrees→90 degrees) or from 85 degrees in the negative direction (85 degrees→0 degrees=360 degrees→90 degrees).

By means of this, in particular, a situation can be prevented in which the rotor blade passes through particularly unfavorable upstream flow conditions when the target position is being approached (again) with the aid of the adjustment drive, and, by means of this, a load on the wind energy installation can be reduced and/or the safety can be increased.

According to one embodiment, the pitch brake (of the respective rotor blade or of the respective rotor blades) is open, at least temporarily, or is in particular opened, at least temporarily, during the brake assisting adjustment mode of operation or during the approach to the target position and, according to one embodiment, it is closed, or, in particular, a closing takes place, after the adjustment in the brake assisting adjustment mode of operation.

According to one embodiment, by means of this, wear and/or an energy consumption can be reduced.

Similarly, the pitch brake (of the respective rotor blade or of the respective rotor blades) can also be closed, in particular remain closed, during the brake assisting adjustment mode of operation or during the approach to the target position.

According to one embodiment, by means of this, the safety can be improved.

According to one embodiment, on the basis of the activation signal which is deviation-dependent, the supply of energy to the adjustment drive or to one or more of the adjustment drives from the energy storage device (or from the respective energy storage device, in particular from the common or individual energy storage device) for adjusting the rotor blade is reconnected, and the (respective) rotor blade is adjusted with the aid of this (reconnected) supply of energy of the (respective) adjustment drive in the brake assisting adjustment mode of operation while the special operating case is still ongoing.

According to one embodiment, by means of this, the safety can be improved, and, in particular, it is possible for the target position to be approached in a reliable manner (or in a more reliable manner).

According to one embodiment, the special operating case and/or the malfunction case comprises a grid failure or a failure of a grid (or of a power grid or of an electricity grid) into which the wind energy installation, at least temporarily, feeds energy, in particular electrical energy, and/or from which the adjustment drive or one or more of the adjustment drives are at least temporarily supplied with energy, in particular in a normal mode of operation or in the absence of the malfunction case, or is/are set up for this purpose.

As has been explained elsewhere, the present invention is advantageous in particular in connection with such a special operating case, in particular a malfunction case, without, however, being limited to this. In particular, in the sense of the present invention, a special operating case can comprise, or be, an operating case or an operating condition in which the shutdown position or the target position, in particular the spinning position or the feathered position, is approached and in which the rotor blade is held in this position by the pitch brake, or in which the shutdown position or the target position, in particular the spinning position or the feathered position, is to be approached and in which the rotor blade is to be held in this position by the pitch brake, for example in order to reduce a load on the wind energy installation in the event of high winds, in order to carry out maintenance on the wind energy installation or in order to reduce the generation of electrical energy by the wind energy installation, for example in order to put into effect a predetermined feed-in into the grid, or the like.

According to one embodiment, the (respective) adjustment drive adjusts the (respective) rotor blade in an electromotive manner, in particular it comprises at least one electric motor, according to one embodiment at least one DC motor, and the energy storage device or one or more of the energy storage devices (respectively) comprise an electrical energy storage device, in particular one or more primary batteries and/or one or more secondary batteries or one or more rechargeable batteries and/or one or more capacitors, in particular super capacitors or ultra capacitors (super caps or ultra caps).

In particular, since such adjustment drives are particularly affected by a power failure, the present invention is particularly advantageous for this purpose.

According to one embodiment, power is supplied to the adjustment drive from the electrical energy storage device via at least one converter, in particular at least one intermediate circuit.

According to one embodiment, by means of this, the adjustment drive can be controlled in the (respective) adjustment mode of operation in an advantageous manner, in particular by means of a control device/system.

According to one embodiment, the supply of energy from the electrical energy storage device is switched off in the shutdown position with the aid of at least one contactor (or switching contactor), and in particular such a switching off takes place.

According to one embodiment, by means of this, the safety can be improved.

Accordingly, in one embodiment, a control device/system or the control device/system overrides this contactor or these contactors, or a control device/system or the control device/system switches this contactor or these contactors, in order to reconnect the supply of energy from the energy storage device in the (respective) adjustment mode of operation.

According to one embodiment, the (respective) adjustment drive adjusts the (respective) rotor blade in a hydraulic manner, and in particular it comprises at least one hydraulic cylinder, and the energy storage device or one or more of the energy storage devices comprise (in each case) a single-chamber (hydraulic) pressure accumulator or a single-chamber (hydraulic) pressure energy storage device or a multi-chamber (hydraulic) pressure accumulator or a multi-chamber (hydraulic) pressure energy storage device, according to one embodiment a single-chamber hydropneumatic storage device (or a single-chamber hydropneumatic pressure accumulator or a single-chamber hydropneumatic pressure energy storage device) or a multi-chamber hydropneumatic storage device (or a multi-chamber hydropneumatic pressure accumulator or a multi-chamber hydropneumatic pressure energy storage device). Accordingly, hydraulic pressure (or a hydraulic pressure supply) for (angular) adjustment of a rotor blade by its hydraulic adjustment drive is also referred to as (a pressure) energy (supply) in the sense of the present invention, and/or the term "energy" is intended to be understood to also refer, in particular, to drive energy for the adjustment drive, in particular, therefore, electrical energy for an electromotive adjustment drive or hydraulic pressure (energy) for a hydraulic adjustment drive. In other words, according to one embodiment, the word "energy" can be replaced by "(hydraulic) pressure" in the present application.

The present invention can also be used to particular advantage in such adjustment drives, in particular because of their construction and their way of operation.

According to one embodiment, the supply of energy from the pressure accumulator is switched off in the shutdown position with the aid of at least one valve, in particular with the aid of at least one automatic valve, for example when a corresponding stroke position of the hydraulic cylinder is being passed over, in particular by a corresponding stroke position of the hydraulic cylinder being passed over, and/or such a switching off takes place.

According to one embodiment, by means of this, the safety can be improved.

Accordingly, in one embodiment, a control device/system or the control device/system overrides this valve or these valves, or a control device/system or the control device/system switches this valve or these valves, in order to reconnect the supply of energy from the energy storage device in the (respective) adjustment mode of operation.

As has already been mentioned elsewhere, one embodiment of the present invention is based on a departure from known safety concepts according to which a renewed adjustment by the adjustment drive or adjustment drives is deliberately precluded during a special operating case, in particular during a malfunction case, after the shutdown position has been reached or after the shutdown positions have been reached.

According to one embodiment, the rotor blade or the rotor blades is/are therefore adjusted with the aid of the (respective) adjustment drive in the (respective) adjustment mode of operation by a safe control device/system, according to one embodiment by a fully or partially redundant safe control device/system. According to one embodiment, this has full or partial diversity and/or comprises at least one safety logic controller (SLC). According to one embodiment, the SLC is a safety control device/system according to IEC 61508/IEC61511 with safety integrity level (SIL) SIL2 or SIL3, which according to one embodiment is arranged in the rotor hub of the wind energy installation.

According to one embodiment, by means of this, the safety of such previously known safety concepts can be combined with the advantages described herein.

According to one embodiment of the present invention, a wind energy installation or the wind energy installation is set up, in particular in terms of hardware and/or software, to carry out a method described herein, and/or comprises:

means for adjusting, in the direction of a shutdown position, the at least one rotor blade with the aid of the adjustment drive or its adjustment drive in the event that at least one special operating case should occur, or according to one embodiment in the event that at least one malfunction case should occur, in particular for adjusting, in the direction of the respective shutdown position, one or more of the rotor blades with the aid of the respective adjustment drive in the event that the special operating case should occur, in particular in the event that the malfunction case should occur;

means for
- switching off a supply of energy to the adjustment drive or to one or more of the adjustment drives from an energy storage device, in particular from an individual or common energy storage device, of the wind energy installation for adjusting the (respective) rotor blade in the direction of the shutdown position; and/or for
- closing a pitch brake of the wind energy installation in order to hold the (respective) rotor blade in its current position in the shutdown position; and means for adjusting the (respective) rotor blade with the aid of the (respective) adjustment drive in an adjustment mode of operation on the basis of at least one activation signal while the special operating case is still ongoing, in particular while the malfunction case is still ongoing.

According to one embodiment, the pitch brake slips, according to plan, at a load acting on the rotor blade which is smaller than a maximum load which acts on the rotor blade in the shutdown position and for which the wind energy installation is constructed, and according to one embodiment, the pitch brake is constructed accordingly or in such a way, in particular dimensioned accordingly or in such a way. According to one embodiment, this load or the maximum load comprises a torque (or a maximum design torque) about the rotor blade axis of rotation.

According to previous safety concepts, the pitch brake must be able to hold the rotor blade on its own, and reliably, in a shutdown position which has been approached, in one embodiment in its feathered position, even when a maximum load acts on the rotor blade which has been assumed in the course of the design of the wind energy installation or on which the design of the wind energy installation has been based or which was expected in the course of the design of the wind energy installation.

In contrast to this, according to one embodiment of the present invention, a slipping of the rotor blade at high load, which rotor blade is held in the shutdown position by means of the pitch brake, in particular at least at a maximum load on the rotor blade which was assumed in the course of the design of the wind energy installation, is deliberately accepted and in this case limited, preferably compensated for, by adjusting the rotor blade with the aid of its adjustment drive, according to one embodiment by means of supply of energy to the adjustment drive from the energy storage device.

This can be of particular advantage in particular if, in particular for safety reasons, the adjustment drive and/or the energy storage device are designed for adjusting the rotor blade to the shutdown position even when the pitch brake is closed, since in this case a deliberately weaker design of the pitch brake makes a correspondingly more favorable construction of the adjustment drive and/or of the energy storage device possible.

As will be clear from what has been stated above, the combination of reconnecting the supply of energy to an adjustment drive from an energy storage device while a special operating case, in particular a malfunction case, is still ongoing, with an adjustment of the rotor blade in the direction of a target position in case a deviation of the rotor blade from a target position exceeds a predetermined threshold value despite the pitch brake being closed, can be of particular advantage. However, the present invention is not limited to this combination, but can, according to one embodiment, also realize only the aspect of reconnecting or only the aspect of adjusting when the threshold in terms of deviation is exceeded.

According to one embodiment, the wind energy installation, or its means, in particular its control device/system, comprises:

means for reconnecting the supply of energy to the adjustment drive from the energy storage device on the basis of at least one reactivating activation signal for adjusting the rotor blade and for adjusting the rotor blade with the aid of this supply of energy to the adjustment drive in a reactivation adjustment mode of operation while the special operating case, in particular the malfunction case, is still ongoing; and/or at least one interface, in particular at least two interfaces, in particular on the rotor, for triggering a reactivating activation signal by means of a manual input; and/or means for triggering a reactivating activation signal if it is detected that a rotational speed of the rotor or a load on the rotor exceeds a predetermined threshold value, in particular means for detecting that a rotational speed of the rotor or a load on the rotor exceeds a predetermined threshold value; and/or means for at least temporarily opening the pitch brake during the reactivation adjustment mode of operation; and/or means for adjusting the rotor blade in the reactivation adjustment mode of operation to a predetermined target position or by a predetermined amount; and/or means for triggering an activation signal which is deviation-dependent if a deviation of the rotor blade from a target position, in particular from the shutdown position or from a predetermined target position which is different from the shutdown position, exceeds a predetermined threshold value, and for adjusting the rotor blade on the basis of the activation signal which is deviation-dependent in a brake assisting adjustment mode of operation while the special operating case, in particular the malfunction case, is still ongoing, wherein the rotor blade is adjusted in the direction of the target position in the brake assisting adjustment mode of operation, in particular means for approaching the target position on the shorter of at least two possible adjustment paths and/or at least temporarily opening the pitch brake during the brake assisting adjustment mode of operation and/or reconnecting the supply of energy to the adjustment drive from the energy storage device for adjusting the rotor blade on the basis of the activation signal which is deviation-dependent and adjusting the rotor blade with the aid of this supply of energy to the adjustment drive in the brake assisting adjustment mode of operation while the special operating case, in particular the malfunction case, is still ongoing.

A means in the sense of the present invention can be constructed in terms of hardware and/or software, and may comprise in particular a processing unit, in particular a microprocessor unit (CPU) or a graphics card (GPU), in particular a digital processing unit, in particular a digital microprocessor unit (CPU), a digital graphics card (GPU) or the like, preferably connected to a memory system and/or a bus system in terms of data and/or signal communication, and/or may comprise one or more programs or program modules. The processing unit may be constructed so as to process instructions which are implemented as a program stored in a memory system, to acquire input signals from a data bus, and/or to output output signals to a data bus. A memory system may comprise one or more storage media, in particular different storage media, in particular optical media, magnetic media, solid state media and/or other non-volatile media. The program may be of such nature that it embodies the methods described herein, or is capable of executing them, such that the processing unit can execute the steps of such methods and thereby in particular operate the wind energy installation.

According to one embodiment, a computer program product may comprise a storage medium, in particular a non-volatile storage medium, for storing a program or having a program stored thereon, and may in particular be such a storage medium, wherein execution of said program causes a system or a control device/system, in particular a computer, to carry out a method described herein, or one or more of its steps.

According to one embodiment, one or more steps of the method, in particular all steps of the method, are carried out in a fully or partially automated manner, in particular by the wind energy installation, in particular by its control device/system or its means.

According to one embodiment, the term "controlling" includes "controlling with feedback".

According to one embodiment, the special operating case or the malfunction case is a grid failure or a malfunction case, in particular a defect of the wind energy installation, in the event of a grid failure, in particular during a grid failure, and/or in the special operating case or in the malfunction case, the adjustment drive is disconnected from a source of energy, according to one embodiment from an (electricity) grid or from a hydraulic source or from a supply of hydraulic energy or from a hydraulic system or from a hydraulic grid, from which it is supplied with energy in a normal mode of operation or in a regular mode of operation, and/or is (instead), at least temporarily, supplied with energy by the energy storage device, in particular for adjustment in the direction of the shutdown position, or the supply of energy to the adjustment drive is switched over from the source of energy to the energy storage device, or such a disconnecting and/or supplying or switching over takes place. According to one embodiment, the source of energy comprises an (electricity) grid or a hydraulic system or a hydraulic network or a hydraulic (pressure) source or a hydraulic (pressure) supply, and according to a further development, the source of energy is an (electricity) grid or a hydraulic system or a hydraulic network or a hydraulic (pressure) source or a hydraulic (pressure) supply. According to one embodiment, a feathered position or the feathered position is a position which is at least substantially perpendicular with respect to an orientation for maximum power output, or which is rotated by at least 85 degrees and/or at most 95 degrees with respect to such an orientation (or such a normal orientation).

According to one embodiment, a target position mentioned here is a feathered position or the feathered position or a spinning position or the spinning position.

Further advantages and features will become apparent from the dependent claims and the example embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
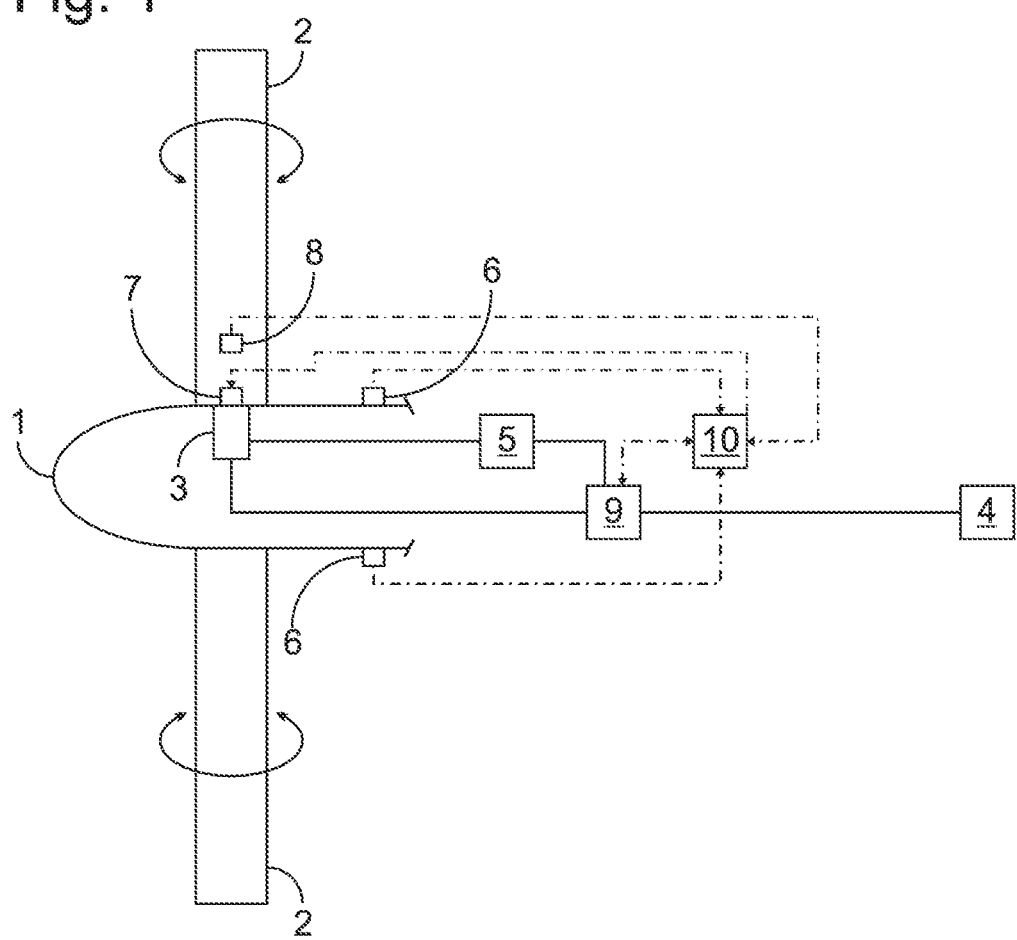
FIG. 1 shows a portion of a wind energy installation in accordance with an embodiment of the present invention.

FIG. 1 shows a portion of a wind energy installation in accordance with an embodiment of the present invention.

In this context, FIG. 1 shows a portion of a rotor or of a rotor hub 1, which has three rotor blades 2, of which two rotor blades, which are offset by 120 degrees about a horizontal rotor axis of rotation, can be seen in FIG. 1, while the third rotor blade, which is offset by a further 120 degrees, is not visible.

Each of the rotor blades can be adjusted (in terms of their angle) about an axis of rotation by means of an electromotive adjustment drive or by means of a hydraulic adjustment drive 3, as is indicated in FIG. 1 by double arrows representing a movement.

In the interest of a more compact illustration, only the actuation of one of the three rotor blades is illustrated in more detail in FIG. 1, whereby the actuation of the three rotor blades is carried out in an identical manner, and, in particular, each of the rotor blades has its own adjustment drive 3.

The (respective) adjustment drive 3 is connected, via a switching arrangement, on the one hand to a source of energy 4, for example an (electricity) grid or a hydraulic (pressure) source, and on the other hand to an internal energy storage device 5, for example one or more rechargeable batteries or a single-chamber or a multi-chamber storage device (or a single-chamber or a multi-chamber pressure accumulator or a single-chamber or a multi-chamber pressure energy storage device), according to one embodiment a single-chamber or a multi-chamber hydropneumatic storage device (or a single-chamber or a multi-chamber hydropneumatic pressure accumulator or a single-chamber or a multi-chamber hydropneumatic pressure energy storage device).

In addition, two interfaces are indicated in FIG. 1 on the rotor in the form of buttons 6 which are arranged sides of the rotor which are opposite to one another, a pitch brake 7 for holding the respective rotor blade 2 and, by way of example, a sensor 8 for detecting an angular position of the rotor blade or a load on the rotor blade or a rotational speed of the rotor or a load on the rotor. As has been mentioned, identical pitch brakes are provided for the other two rotor blades, as well as, if applicable, further sensors for detecting their rotor blade positions and/or their rotor blade loads, and they are not shown in FIG. 1 in the interest of a more compact illustration.

One control device/system is indicated by reference number 10.

In FIG. 1 it is also indicated that the energy storage device 5 can supply the adjustment drive 3 with energy both directly and indirectly, for example via an intermediate circuit or a converter 9.

In a step S 10, the control device/system detects a special operating case, in particular a malfunction case, in the example embodiment a power failure.

In a step S 20, the control device/system then adjusts the rotor blades 2 with the aid of the adjustment drives 3 supplied with energy from the energy storage device or the energy storage devices 5 to a shutdown position, in the example embodiment a spinning position, which differs from a feathered position by about 5 degrees, so that, in normal wind conditions, the rotor continues to rotate slowly.

Figure 2:
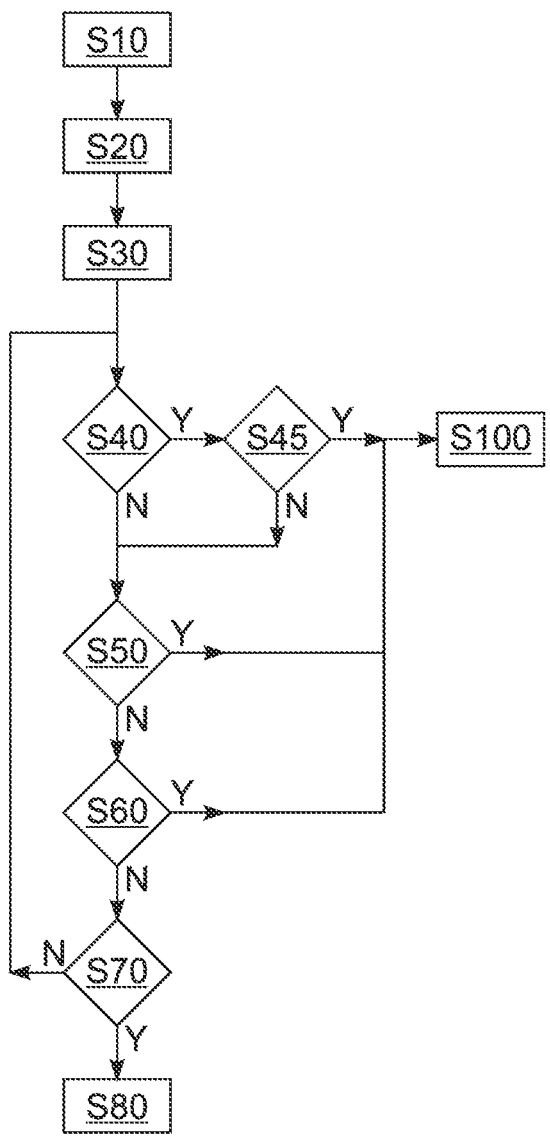
FIG. 2 shows a method of operating the wind energy installation in accordance with an embodiment of the present invention.

When the spinning position is reached, this supply of energy of the respective adjustment drive 3 is switched off, for example automatically by a contactor (not shown), and the respective pitch brake 7 is closed (FIG. 2: step S 30).

If one of the buttons 6 is actuated once (S 40: "Y"), a change to a standby mode takes place. If one of the buttons 6 is pressed again in this mode (S 45: "Y"), a reactivating activation signal is triggered and the supply of energy from the energy storage device or devices 5 to the adjustment drives 3 is then reconnected, for example by overriding the contactor, and the adjustment drives 3 adjust the rotor blades 2 from the spinning position to their feathered position while the power failure is still ongoing (FIG. 2: Step S 100).

If the button 6 is not actuated (S 40: "N") or if it is not actuated again in the standby mode (S 45: "N"), the method continues with step S 50, in which a check is carried out on the basis of the signals from the sensor or sensors 8 as to whether the rotational speed of the rotor 1 or the load on the rotor blades exceeds a predetermined threshold value.

If this is the case (S 50: "Y"), a reactivating activation signal is triggered analogously and then the supply of energy from the energy storage device or devices 5 to the adjustment drives 3 is reconnected and the adjustment drives 3 adjust the rotor blades 2 from the spinning position to their feathered position while the power failure is still ongoing (FIG. 2: step S 100).

If this is not the case (S 50: "N"), in a step S 60, a check is carried out on the basis of the signals from the sensor or sensors 8 as to whether a deviation of one of the rotor blades from its target position (spinning position or feathered position) exceeds a specified threshold value.

If this is the case (S 60: "Y"), an activation signal which is deviation-dependent is triggered and the supply of energy from the energy storage device or devices 5 to the corresponding adjustment drive 3 is then reconnected and this adjustment drive 3 moves this rotor blade 2 to its target position while the power failure is still ongoing (FIG. 2: step S 100).

In a step S 80, the regular operation is resumed when the power failure has ended (S 70: "Y").

Figure 3:
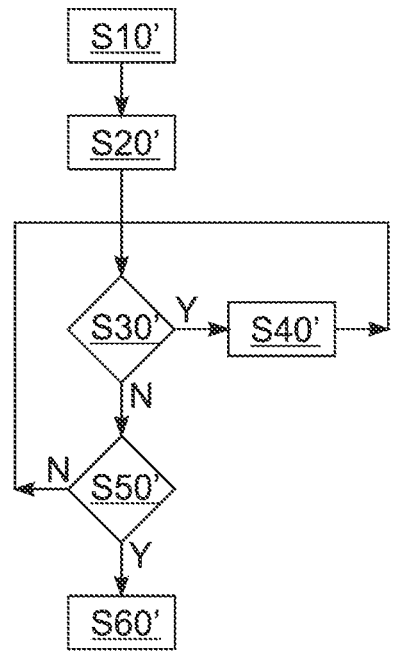
FIG. 3 shows a method of operating the wind energy installation in accordance with a further embodiment of the present invention.

According to an embodiment shown in FIG. 3, only one brake assisting adjustment mode of operation is provided:

In a step S 10', the control device/system detects a special operating case, for example a desired shutdown of the wind energy installation.

In a step S 20', the control device/system then moves the rotor blades 2 to a shutdown position, in this example embodiment a feathered position, with the aid of the adjustment drives 3 supplied with energy from the source of energy 4, and the respective pitch brake 7 is closed after the shutdown position has been reached.

In a step S 30', a check is carried out as to whether a deviation of one of the rotor blades from its feathered position exceeds a specified threshold value.

This can be the case, in particular, if the rotor blade slips away off from its pitch brake or if its pitch brake slips (through) as a result of the latter being designed to be weaker than the maximum design load on the rotor blade.

If this is the case (S 30': "Y"), an activation signal which is deviation-dependent is triggered and then the associated adjustment drive 3 moves this rotor blade 2 back to its feathered position by the shortest route, while the special operating case "desired shutdown of the wind energy installation" is still ongoing (FIG. 3: step S 40').

In a step S 60', the regular operation is resumed when the power failure has ended (S 50': "Y").

Although example embodiments have been explained in the preceding description, it is to be noted that a variety of variations are possible.

For example, in particular in the example embodiment of FIG. 2, one or more of the branching points (S 40, S 45), S 50 or S 60 can be omitted, or different adjustment modes of operation can be triggered by the buttons (S 40, S 45), sensors (S 50) and/or slipping pitch brakes (S 60). In addition or as an alternative, the special operating case can also be, for example, a malfunction case during a power failure, whereby initially, as a result of the power failure, the adjustment is carried out by means of the energy storage device and the converter, and during the power failure the malfunction occurs that the converter is defective, so that the adjustment all the way to the spinning position is now carried out via direct connection of the energy storage device to the adjustment drive.

In addition, it is to be noted that the example embodiments are merely examples which are not intended to limit the scope of protection, the applications and the structure in any way. Rather, the preceding description provides the person skilled in the art with a guideline for the implementation of at least one example embodiment, whereby various modifications, in particular with regard to the function and the arrangement of the components described, can be made without departing from the scope of protection as it results from the claims and combinations of features equivalent to these.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 rotor (or rotor hub)
2 rotor blade
3 adjustment drive
4 grid/hydraulic source (hydraulic pressure source) or (source of energy)
5 rechargeable battery/pressure accumulator (energy storage device)
6 button (interface)
7 pitch brake
8 sensor or sensors (angular position/load/rotational speed)
9 converter/intermediate circuit
10 control device/system

What is claimed is:

1. A method of operating a wind energy installation, the wind energy installation including a rotor with at least one rotor blade that is adjustable in terms of an angle of the at least one rotor blade, and an adjustment drive for adjusting the at least one rotor blade, the method comprising:

adjusting the at least one rotor blade in a direction of a shutdown position with the adjustment drive in response to the occurrence of at least one special operating case;

in the shutdown position of the at least one rotor blade, at least one of:

switching off a supply of energy from an energy storage device to the adjustment drive for adjusting the at least one rotor blade in the direction of the shutdown position in response to a condition wherein switching off the supply of energy has not already occurred, or closing a pitch brake configured for holding the at least one rotor blade in a current position in response to a condition wherein closing the pitch brake has not already occurred; and then, based on at least one activation signal, adjusting the at least one rotor blade with the adjustment drive in an adjustment mode of operation while the at least one special operating case is still ongoing.

2. The method of claim 1, wherein at least one of:

the at least one special operating case is at least one malfunction case;

the at least one rotor blade is adjusted in the adjustment mode of operation while the at least one malfunction case is still ongoing; or the wind energy installation comprises:

means for adjusting the at least one rotor blade in the direction of the shutdown position with the adjustment drive in response to the occurrence of the at least one special operating case, at least one of:

means for switching off, in the shutdown position of the at least one rotor blade, the supply of energy from the energy storage device for adjusting the at least one rotor blade to the adjustment drive for adjusting the at least one rotor blade in the direction of the shutdown position in response to a condition wherein switching off the supply of energy has not already occurred, or the pitch brake configured to hold the at least one rotor blade in a current position in the shutdown position, and means for adjusting the at least one rotor blade with the adjustment drive and based on the at least one activation signal in the adjustment mode of operation while the at least one special operating case is still ongoing.

3. The method of claim 1, further comprising:

on the basis of at least one reactivating activation signal, switching back on the supply of energy for adjusting the at least one rotor blade to the adjustment drive from the energy storage device; and adjusting the at least one rotor blade with the supply of energy to the adjustment drive in a reactivation adjustment mode of operation while the at least one special operating case is still ongoing.

4. The method of claim 3, wherein the at least one special operating case is at least one malfunction case.

5. The method of claim 3, further comprising:

triggering a reactivating activation signal by at least one manual input via at least one interface.

6. The method of claim 5, wherein at least one of:

the at least one interface is on the rotor;

triggering the reactivating activation signal requires at least two manual inputs; or triggering the reactivating activation signal is possible via at least two interfaces.

7. The method of claim 3, wherein the at least one reactivating activation signal is triggered in response to detecting that a rotational speed of the rotor or a load on the rotor exceeds a predetermined threshold value.

8. The method of claim 3, further comprising opening the pitch brake, at least temporarily, if the pitch brake is not already opened, during the reactivation adjustment mode of operation.

9. The method of claim 3, further comprising adjusting the at least one rotor blade to a predetermined target position or by a predetermined amount in the reactivation adjustment mode of operation.

10. The method of claim 1, further comprising:

triggering a deviation-dependent activation signal in response to a deviation of the at least one rotor blade from a target position exceeding a predetermined threshold value; and on the basis of the activation signal, adjusting the at least one rotor blade in a brake assisting adjustment mode of operation while the at least one special operating case is still ongoing;

wherein, in the brake assisting adjustment mode of operation, the at least one rotor blade is adjusted in the direction of the target position.

11. The method of claim 10, wherein at least one of:

the target position is the shutdown position or a predetermined target position which is different from the shutdown position; or the at least one special operating case is at least one malfunction case.

12. The method of claim 10, further comprising at least one of:

moving the at least one rotor blade to the target position on the shorter of at least two possible adjustment paths in the brake assisting adjustment mode of operation;

opening the pitch brake, at least temporarily, during the brake assisting adjustment mode of operation; or on the basis of the activation signal which is deviation-dependent:

switching back on the supply of energy for adjusting the at least one rotor blade to the adjustment drive from the energy storage device, and adjusting the at least one rotor blade with the supply of energy to the adjustment drive in the brake assisting adjustment mode of operation while the at least one special operating case is still ongoing.

13. The method of claim 12, wherein the at least one special operating case is at least one malfunction case.

14. The method of claim 1, wherein at least one of:

the at least one special operating case comprises a power failure; or adjusting the at least one rotor blade with the adjustment drive in the adjustment mode of operation comprises adjusting the at least one rotor blade using a safe control device/system.

15. The method of claim 14, wherein adjusting the at least one rotor blade with the adjustment drive in the adjustment mode of operation comprises adjusting the at least one rotor blade using a redundant safe control device/system.

16. The method of claim 1, wherein:

the adjustment drive adjusts the at least one rotor blade in an electromotive manner, and the energy storage device comprises an electrical energy storage device; or the adjustment drive adjusts the at least one rotor blade in a hydraulic manner, and the energy storage device comprises a pressure accumulator.

17. A wind energy installation, comprising:
a rotor with at least one rotor blade that is adjustable in terms of an angle of the at least one rotor blade;
an adjustment drive for adjusting the at least one rotor blade;
means for adjusting the at least one rotor blade in a direction of a shutdown position with the adjustment drive in response to the occurrence of at least one special operating case;
at least one of:
  means for switching off, in the shutdown position of the at least one rotor blade, a supply of energy from an energy storage device for adjusting the at least one rotor blade to the adjustment drive for adjusting the at least one rotor blade in the direction of the shutdown position in response to a condition wherein switching off the supply of energy has not already occurred, or
  a pitch brake configured to hold the at least one rotor blade in a current position in the shutdown position; and
means for further adjusting the at least one rotor blade with the adjustment drive and based on at least one activation signal in an adjustment mode of operation while the at least one special operating case is still ongoing.

18. The wind energy installation of claim 17, wherein the at least one special operating case is at least one malfunction case.

19. The wind energy installation of claim 17, wherein the pitch brake is configured to slip at a load acting on the at least one rotor blade that is smaller than a maximum design load for the at least one rotor blade in the shutdown position.

20. A computer program product for operating a wind energy installation, the wind energy installation including a rotor with at least one rotor blade that is adjustable in terms of an angle of the at least one rotor blade, and an adjustment drive for adjusting the at least one rotor blade, the computer program product comprising program code stored on a non-transitory, computer-readable storage medium, the program code, when implemented on a computer, causes the computer to:
adjust the at least one rotor blade in a direction of a shutdown position with the adjustment drive in response to the occurrence of at least one special operating case;
in the shutdown position of the at least one rotor blade, a least one of:
  switch off a supply of energy from an energy storage device to the adjustment drive for adjusting the at least one rotor blade in the direction of the shutdown position in response to a condition wherein the supply of energy has not already been switched off, or
  close a pitch brake that is configured for holding the at least one rotor blade in a current position in response to a condition wherein the pitch brake has not already been closed; and
then, based on at least one activation signal, adjust the at least one rotor blade with the adjustment drive in an adjustment mode of operation while the at least one special operating case is still ongoing.

* * * * *